(12) United States Patent
Kankainen

(10) Patent No.: US 9,766,089 B2
(45) Date of Patent: *Sep. 19, 2017

(54) METHOD AND APPARATUS FOR CORRELATING AND NAVIGATING BETWEEN A LIVE IMAGE AND A PRERECORDED PANORAMIC IMAGE

(75) Inventor: Mikko Kankainen, Helsinki (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 1080 days.

This patent is subject to a terminal disclaimer.

(21) Appl. No.: 12/637,057

(22) Filed: Dec. 14, 2009

(65) Prior Publication Data

US 2011/0141141 A1    Jun. 16, 2011

(51) Int. Cl.
| | | |
|---|---|---|
| G01C 21/36 | (2006.01) | |
| G06T 3/40 | (2006.01) | |
| H04N 5/232 | (2006.01) | |
| H04N 5/272 | (2006.01) | |
| H04N 21/2187 | (2011.01) | |

(Continued)

(52) U.S. Cl.
CPC ..... G01C 21/3647 (2013.01); H04N 5/23216 (2013.01); H04N 5/23229 (2013.01); H04N 5/23293 (2013.01); H04N 5/272 (2013.01); G06T 3/4038 (2013.01); H04N 5/23238 (2013.01); H04N 21/2187 (2013.01); H04N 21/4524 (2013.01); H04N 21/8146 (2013.01)

(58) Field of Classification Search
CPC .. G06T 3/4038; H04N 1/3876; H04N 5/2259; H04N 5/23238; H04N 5/2628; H04N 5/3415; H04N 2013/0088; G02B 13/06; G06K 9/36; G06F 3/048; A63J 13/00; G03B 37/00

USPC .............. 382/284; 348/143, 14.01, 218.1
See application file for complete search history.

(56) References Cited

U.S. PATENT DOCUMENTS 6,510,283 B1 * 1/2003 Yamagishi ............... 396/55
6,563,529 B1 * 5/2003 Jongerius ................. 348/36
(Continued)

FOREIGN PATENT DOCUMENTS

WO    WO 2009/105603 A1    8/2009

OTHER PUBLICATIONS

Integrated Project on Interaction and Presence in Urban Environments, Sareika, et al., Mar. 10, 2010. Accessed: http://www.ipcity.eu/wp-content/uploads/2010/03/D5.4%20Final%20report%20on%20infrastructure.pdf, pp. 1-32.

(Continued)

Primary Examiner — Ulka Chauhan
Assistant Examiner — Sae Won Yoon
(74) Attorney, Agent, or Firm — Ditthavong & Steiner, P.C.

(57) ABSTRACT

An approach is provided for correlating and navigating between a live camera image and a prerecorded panoramic image. A mapping and augmented reality application correlates at least one live image with a prerecorded panoramic image, when a location of a device used to capture the at least one live image matches a location of a device used to capture the panoramic prerecorded image. The mapping and augmented reality application causes, at least in part, automatically alternating presentation on a screen of the device capturing the at least one live image, of the at least one live image and the prerecorded panoramic image.

19 Claims, 12 Drawing Sheets

(51) Int. Cl.
*H04N 21/45* (2011.01)
*H04N 21/81* (2011.01)

(56) References Cited

U.S. PATENT DOCUMENTS

| | | | |
|---|---|---|---|
| 6,657,667 B1* | 12/2003 | Anderson | 348/333.12 |
| 6,798,923 B1* | 9/2004 | Hsieh et al. | 382/284 |
| 7,107,090 B2 | 9/2006 | Salisbury, Jr. et al. | |
| 7,460,953 B2* | 12/2008 | Herbst et al. | 701/438 |
| 7,576,732 B2* | 8/2009 | Lii | 345/173 |
| 7,732,768 B1* | 6/2010 | Haigh et al. | 250/332 |
| 7,966,024 B2* | 6/2011 | Cohen | 455/456.3 |
| 2001/0010546 A1* | 8/2001 | Chen | 348/218 |
| 2001/0040671 A1* | 11/2001 | Metcalf | 353/94 |
| 2005/0028221 A1* | 2/2005 | Liu et al. | 725/133 |
| 2005/0041100 A1* | 2/2005 | Maguire, Jr. | 348/121 |
| 2006/0133667 A1* | 6/2006 | Schoelkopf et al. | 382/162 |
| 2006/0238617 A1* | 10/2006 | Tamir | 348/143 |
| 2007/0025723 A1* | 2/2007 | Baudisch et al. | 396/287 |
| 2007/0081081 A1* | 4/2007 | Cheng | 348/218.1 |
| 2007/0273558 A1* | 11/2007 | Smith et al. | 340/995.1 |
| 2007/0273758 A1 | 11/2007 | Mendoza et al. | |
| 2008/0016534 A1* | 1/2008 | Ortiz et al. | 725/62 |
| 2008/0062250 A1* | 3/2008 | Rye et al. | 348/14.01 |
| 2008/0136895 A1* | 6/2008 | Mareachen | 348/14.03 |
| 2008/0291217 A1* | 11/2008 | Vincent et al. | 345/629 |
| 2009/0055019 A1* | 2/2009 | Stiehl et al. | 700/249 |
| 2009/0202102 A1 | 8/2009 | Miranda et al. | |
| 2009/0240431 A1* | 9/2009 | Chau et al. | 701/208 |
| 2011/0254915 A1* | 10/2011 | Vincent et al. | 348/36 |

OTHER PUBLICATIONS

Integrated Project on Interaction and Presence in Urban Environments, Sareika, et al., Mar. 10, 2010. Accessed: http://www.ipcity.eu/wp-content/uploads/2010/03/D5.4%20Final%20report%20on%20infrastructure.pdf, pp. 33-65.

System for Active Video Observation over the Internet, Batagelj, et al., Accessed: Aug. 23, 2010, http://citeseerx.ist.psu.edu/viewdoc/download?doi=10.1.1.19.6095&rep=rep1&type=pdf, pp. 1-4.

Office Action for related U.S. Appl. No. 13/179,089 dated Mar. 23, 2012, pp. 1-40.

Final Rejection for related U.S. Appl. No. 13/179,089 dated Jul. 6, 2012, pp. 1-47.

* cited by examiner

METHOD AND APPARATUS FOR CORRELATING AND NAVIGATING BETWEEN A LIVE IMAGE AND A PRERECORDED PANORAMIC IMAGE

BACKGROUND

Service providers (e.g., wireless, cellular, Internet, content, social network, etc.) and device manufacturers are continually challenged to deliver value and convenience to consumers by, for example, providing compelling network services. One area of interest has been the development of mapping and navigating graphics (e.g., digital maps) and/or images (e.g., 360° panoramic street-level views of various locations and points of interest) augmented with, for instance, navigation tags and location relevant content. Typically, navigation, mapping, and other similar services can display prerecorded panoramic views in addition to two-dimensional and/or three-dimensional rendered maps, while augmented reality applications display live camera views of surrounding points of interest. Each type of view (i.e., panoramic view and live view) has respective advantages and disadvantages. However, a user generally has to switch applications and/or click through many layers of Internet browsing to switch between the two views manually. For example, prerecorded panoramic image data are well organized and geo-tagged with rich content. However, they may be out-dated (e.g., sometimes months or years old), such that they are significantly different from current views of the same locations. On the other hand, the live image views best represent the current locations, but the availability of live imagery is normally limited to what is currently visible to one or more cameras accessible to the user. Accordingly, to exploit the advantages of each type of view, service providers and device manufacturers face significant technical challenges to enabling users to efficiently navigate between the a live and a prerecorded view of points of interests.

Some Example Embodiments

Therefore, there is a need for an approach for correlating and navigating between a live camera image and a prerecorded panoramic image.

According to one embodiment, a method comprises correlating at least one live image with a prerecorded panoramic image, when a location of a device used to capture the at least one live image matches a location of a device used to capture the panoramic prerecorded image. The method also comprises causing, at least in part, automatically alternating presentation on a screen of the device capturing the at least one live image, of the at least one live image and the prerecorded panoramic image.

According to another embodiment, an apparatus comprising at least one processor, and at least one memory including computer program code, the at least one memory and the computer program code configured to, with the at least one processor, cause, at least in part, the apparatus to correlate at least one live image with a prerecorded panoramic image, when a location of a device used to capture the at least one live image matches a location of a device used to capture the panoramic prerecorded image. The apparatus is also caused to cause, at least in part, automatically alternating presentation on a screen of the device capturing the at least one live image, of the at least one live image and the prerecorded panoramic image.

According to another embodiment, a computer-readable storage medium carrying one or more sequences of one or more instructions which, when executed by one or more processors, cause, at least in part, an apparatus to correlate at least one live image with a prerecorded panoramic image, when a location of a device used to capture the at least one live image matches a location of a device used to capture the panoramic prerecorded image. The apparatus is also caused to cause, at least in part, automatically alternating presentation on a screen of the device capturing the at least one live image, of the at least one live image and the prerecorded panoramic image.

According to another embodiment, an apparatus comprises means for correlating at least one live image with a prerecorded panoramic image, when a location of a device used to capture the at least one live image matches a location of a device used to capture the panoramic prerecorded image. The apparatus also comprises means for causing, at least in part, automatically alternating presentation on a screen of the device capturing the at least one live image, of the at least one live image and the prerecorded panoramic image.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for correlating and navigating between a live camera image and a prerecorded panoramic image are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known hardware components and devices are shown in block diagram form in order to avoid unnecessarily obscuring the embodiments of the invention.

As used herein, the term "image" refers to one or a series of images taken by a camera (e.g., a still camera, digital camera, video camera, camera phone, etc.) or any other imaging equipment. Although various embodiments are described with respect to a live camera view, it is contemplated that the approach described herein may be used with other live images (e.g., a still image, a live view, a live webcam view, etc.) as long as the image is associated with a location, a tilt angle, and heading of the imaging device (e.g., camera) at the time of image capture.

As used herein, the term "point of interest" (POI) refers to any point specified by a user. By way of example, the point of interest can be a landmark, restaurant, museum, building, bridge, tower, dam, factory, manufacturing plant, space shuttle, etc.

Figure 1:
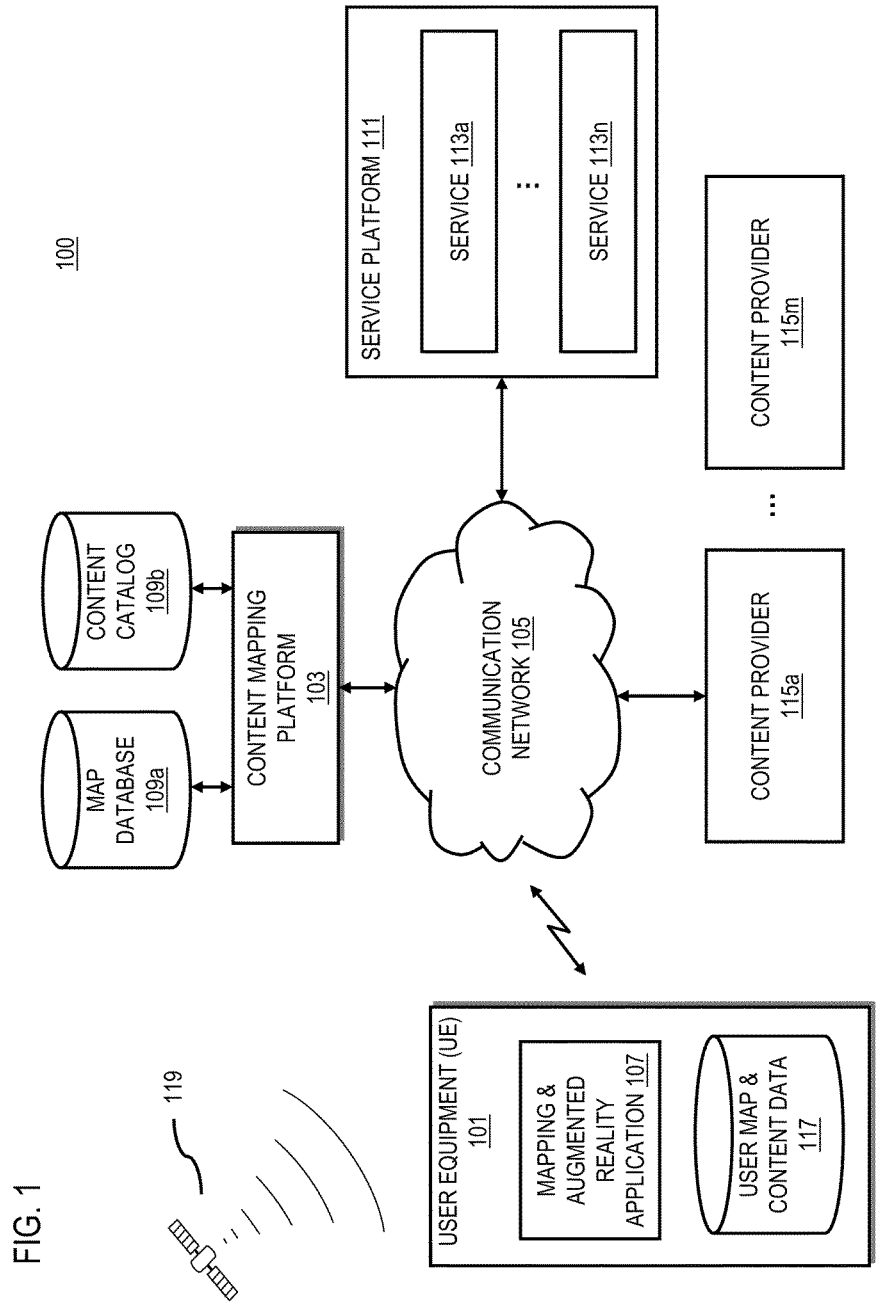
FIG. 1 is a diagram of a system capable of correlating and navigating between a live image and a prerecorded panoramic image, according to one embodiment.

FIG. 1 is a diagram of a system capable of correlating and navigating between a live image and a prerecorded panoramic image, according to one embodiment. As mentioned previously, existing augmented reality, navigation, mapping, and other like services and systems display either a live camera view or a prerecorded panoramic view of points of interest, but do not generally attempt to merge the two views in one service. A user has to switch applications and click through many layers of screens to switch between the two views manually, so as to access the live images as well as prerecorded panoramic images and related rich location relevant content over the Internet, using computers, mobile devices, and other Internet-connected devices. After switching between the two views, it is then possible to use geographic coordinate data to retrieve relevant content geo-tagged in either of the views. Location relevant content data are not limited to well-known landmarks (such as the Washington Monument, the Eiffel Tower, etc.) and are available for any number of user-defined points of interest (e.g., a favorite hiking trail or a user's backyard, etc.), since virtual/digital map information systems typically allow users to geo-tag user-generated media content (e.g., texts, photos, music, videos, etc.) and associated them to any point of interest. However, because users have to switch between applications to access either the live view (e.g., accessed via an augmented reality service) or the prerecorded panoramic image (e.g., mapping application), not all of the geo-tagged content is readily or conveniently accessible in one application. For example, the burden of having to maintain multiple applications may discourage users from taking full advantage to either the live view or the prerecorded panoramic view.

By way of example, when a user is standing at a particular location (e.g., near the Treasure Island on the Las Vegas Strip) and wants to view augmented content data (e.g., hours, prices, etc.) of one or more points of interest (e.g., casinos, restaurants, etc.) within the field of view of the current location (i.e. the Treasure Island), the user can activate either an existing prerecorded panoramic viewing system or an existing live image view system. If the user wants to switch between the two systems, the user needs to switch between the respective applications supporting the systems. The existing prerecorded panoramic viewing system can be accessed locally, but is usually accessed via the Internet if it is a completed system loaded with significant amount of information.

If the user wants to see the image of an Eiffel Tower look-alike that is outside of the user's field of view. The user needs to do a general search online to find out the address and/or map of the Eiffel Tower look-alike, and then retrieves a prerecorded street view (e.g., a prerecorded panoramic view) of the point of interest. If a user wants to find out how to walk from the Treasure Island to an Eiffel Tower look-alike, the user needs to retrieve walking directions as well. During the walk, the user may want to switch between the prerecorded view of the Eiffel Tower look-alike and the live camera view of the Las Vegas Strip, to, for example, take photos or video clips in the live image view while exploring the content tagged in the prerecorded views of the Eiffel Tower look-alike and other points of interest on the route (such as the Venetian). However, the user has to maneuver via different applications and layers of screens and internet browsing to switch back and forth the two views according to the existing systems. As a result, the user may be discouraged from switching between the two views.

To address the problems described above, a system 100 of FIG. 1 introduces the capability of presenting a simple and intuitive interface which enables the user to correlate and navigate between a live camera image and a prerecorded panoramic image.

As another example, when the user stands at a current location (e.g., the Farragut West METRO Station), the user can operate in a panorama mode which displays the live image view and a prerecorded panoramic view seamlessly, without rotating or even moving a user device, e.g., the UE 101. The panorama mode starts with a live camera view. The user can navigate "out" of the live image view by indicating a point of interest outside of the live image view and ordering the switch. Conversely, the user can navigate back to the live image view from the prerecorded panoramic view by ordering another switch, without going via two applications and layers of screens as in the conventions systems.

To indicate a point of interest, the user can enter the text describing the POI, touch the corresponding point on a 2D or 3D map on the screen, use a navigational arrow superimposed on the live image view, or any other ways conceivable by one skilled in the art. The POI can be at the same location as the current location or at a different location. In either situation, the system 100 enables the switch between the two views within the same software application.

The system 100 allows switching from a live image to a prerecorded panoramic image of the same background of a different time (e.g., a panoramic view taken at a different time of the day, a different day, a different season, a different year, etc.). For example, the user wants to see during the day time in the winter of 2009 the panorama view of the METRO station at a night time, in the spring, or in 1995, etc. The system also allows switching from a live image of a current scene (e.g., at or near the METRO Station) to a prerecorded panoramic image of a different background (e.g., at or near the IMF).

By way of example, the surrounding of the Station may contain one or more points of interest (e.g., restaurants) tagged with augmented content (e.g., cosines, ratings, prices, hours, etc.), and the user can see the augmented content in a live image view. The system 100 allows the user to switch or enter from the live image view to a prerecorded panoramic view of one of the point of interest (e.g., one of the restaurants). The system 100 can show a prerecorded panoramic view taken at the current location or a nearby location associated with the selected restaurant. The near-by location may be fifteen feet away from the currently location (e.g., the White House Conference Center), and the prerecorded panoramic view taken from the near-by location shows the selected restaurant. As another example, the user can order a prerecorded panoramic view of a POI outside of the live image view, such the restaurant lounge, or the International Monetary Fund (IMF) headquarters in Washington, D.C.

Whenever the user wants to enter into a prerecorded view, the user can touch a Switch icon or press a Switch button to order the switch. In another embodiment, the user can navigate out/in of the live image view by moving/dragging an augmented navigational arrow out/in of the live image view. Once the navigational arrow reaches the edge of the screen, the system 100 enters/exits the above-described prerecorded panoramic images as selected by the user.

In another embodiment, rather than displaying a prerecorded panoramic view, the system 100 retrieves and stitches a prerecorded still image right next to the live image side by side then displays the seamlessly stitched images to the user.

To make the switch seamlessly, the system 100 correlates a prerecorded panoramic image that has the same tilt angle and has directional heading right next to the live image, and displays the correlated prerecorded panoramic image on the screen. Even if two images were taken by the same device at the same location with the same tilt angle and the same directional heading, the coverage of the images can be different due to a height of the user or the settings (e.g., digital zooming, contrast, resolution, edited, clipped, etc.). If two images were taken by two devices at the same location with the same tilt angle and the same directional heading, the coverage of the images can still be different due to different specifications of the two devices. The devices can have different imaging specifications, such as LCD size, optical zoom, digital zoom, zoom wide, zoom telephoto, effective pixels, pixel density, image stabilization, aperture range, etc. which affect the quality and depth of images taken by two devices.

However, the existing photo matching technology allows near 100% matching between the live image and the prerecorded panoramic images. There are photo matching applications (e.g., photo-match online search engines which compare images pixel by pixel) for choosing the best matched panoramic still image for the live image. There are also photo stitching applications which make the boundary between the live image and a prerecorded panoramic still image seamlessly. As the user continues touching the navigational arrow touching the edge of the screen, more prerecorded panoramic still images are matched and stitched to roll out to the screen as a panoramic view on the fly.

Conversely, the user can navigate back into the live image view from the prerecord image. The system 100 can switch back right away, since the live image view does not require selecting any POI, correlating the POI with the currently location, or any photo matching/stitching. The user can touch a Switch icon or press a Switch button to switch right back to the live image view. In another embodiment, the user can navigate back to the live image view by moving/dragging the augmented navigational arrow back to the live image view.

To navigate from the current location to a POI, the user indicates to the system 100 the POI as the destination. By way of example, when the system 100 receives a target location such as the International Monetary Fund (IMF) Building as the intended POI (e.g., received as text, or on a digital map on the screen of the UE 101, etc.), the system 100 retrieves location data (e.g., an address, GPS coordinates, etc.) of the IMF, or the location data of the device used to capture a prerecorded panoramic image of the IMF (e.g., if the POI is not as well-known as the IMF, such as a carousel in a park). The system 100 then maps a route from the current location (e.g., the METRO Station) to the designated POI, and presents the route on a digital map to the user. While the user is walking along the route, the system 100 presents a live image view of the surrounding location on the screen. Whenever the user wants to switch among a live image view, a prerecorded panoramic view of the destination, and a prerecorded panoramic view of other points of interests, the user can freely do so according to the above-described embodiments, without going through different applications and/or layers of Internet browsing. The other points of interest may be located on the route, such as the World Bank Building located next to IMF, or not located on the route, such as the White House.

The system 100 correlates at least one of the live images with a prerecorded panoramic image on demand by a user or automatically based a condition. The condition may be a location condition (e.g., the UE 101 arrives at the destination POI). The condition may be a distance condition (e.g., the UE 101 is within 100 feet from the destination POI, or from another POI such as a restaurant), etc. As previously mentioned, the user may use a Switch icon, a Switch button, a navigational arrow, or other similar user interface element to switch between a live image and a prerecorded panoramic image.

In another embodiment, if the user continues touching the "Switch" icon long enough (e.g., a few seconds), the system 100 will display a Switching Options dropdown next to the "Switch" icon. By way of example, the switching options include a panorama mode, a "go to" mode, a pre-set specific application, a pre-set webpage, etc. By selecting the panorama mode, the user sets the "Switch" icon to switch between the live image view and the prerecorded panoramic view as default, such that the system 100 reacts to touching the "Switch" icon each time by automatically switching between the two views. By selecting the "go to" mode, the user sets the "Switch" icon to switch between the live image view and the "go to" website browsing screen as default, such that the system 100 reacts to touching the "Switch" icon each time by automatically switching between the live image view and the "go to" website browsing screen. The "go to" website browsing screen contains websites previously entered/browsed by the user and/or favorite websites set by the user. By selecting the pre-set specific application (e.g., an augmented reality travel guide or planner), the user sets the "Switch" icon to switch between the live image view and the pre-set specific application as default, such that the system 100 reacts to touching the "Switch" icon each time by automatically switching between the live image view and the pre-set specific application. By selecting the pre-set webpage, the user sets the "Switch" icon to switch between the live image view and the pre-set webpage as default, such that the system 100 reacts to touching the "Switch" icon each time by automatically switching between the live image view and the pre-set webpage.

In one embodiment, the system 100 displays on the screen of the UE 101 different portions of the prerecorded panoramic view depending upon the tilt angle and directional heading of the UE 101 as tilted and/or rotated by the user. In this embodiment, the user can change the prerecorded panoramic image in the prerecorded panoramic view, without moving/dragging a viewing tag on the screen of the UE 101.

In another embodiment, when the UE 101 is displaying a live image, the user can switch to a prerecorded panoramic image of a portion or section of the live view that may be hidden or otherwise obscured with respect to the current view point. For example, the user has the Treasure Island Hotel displayed in the live image view that also depicts a view of turn on Las Vegas Boulevard. To see what is behind the turn, the user can tap at the turn of the Boulevard on the screen in the live view to switch to a prerecorded panoramic view taken from that turn. In one embodiment, the user can move the Switch icon to the turn of the Boulevard on the screen, and then tap the Switch icon to switch to the prerecorded panoramic view taken from the turn. In this prerecorded panoramic view, the user can rotate and tilt the UE 101 to preview what is behind the turn of the Boulevard, before the user actually walks to the turn. When the user rotates the UE 101 to point to the direction the user is in the real world, the prerecorded panoramic view is, for instance, augmented with an indicator (e.g., a human character or avatar) to show the user's current location in the prerecorded panorama view.

In another embodiment, the system 100 further utilizes the augmented reality or augmented virtuality (e.g., using 3D models and 3D mapping information) to insert rich content information relevant to the POI (e.g., drawn from the Internet) in the live image view in a real time manner. The content relevant to the POI can also be seen in the prerecorded panoramic view, and the contact may be already embedded/tagged in the in the prerecorded panoramic view, or inserted in a real time manner. When the user rotates/tilts the UE 101, the content relevant to any pre-set POIs in the live image view or the prerecorded panoramic view automatically pops out. The POIs can be pre-set by users, service providers (e.g., wireless, cellular, Internet, content, social network, etc.), and/or device manufacturers, and the relevant content can be embedded/tagged by any one of a combination of these entities as well.

By way of example, the user selects the fourth floor of a department as a POI, and tags content information of the POI retrieved from the department store website. The system 100 saves the POI and the tagged content, and presents to the user most updated content information in the live image view and/or the prerecorded panoramic view, automatically or on demand. The content information may include: (1) a floor plan of the POI, (2) the occupants/shops/facilities located in the POI (e.g., in thumbnail images, animation, audio alerts, etc.), (3) introduction and background content with respect to the occupants/shops/facilities, (4) marketing and sales content with respect to the occupants/shops/facilities, or any other data or information tied to the POI. It is also contemplated that content may be associated with multiple floors. The content information includes live media, stored media, metadata associated with media, text information, location information of other user devices, mapping data, geo-tagged data, or a combination thereof.

In another embodiment, the system 100 enables the user to browse available content of the POI by time. For example, the user can specify a time in the past, present, or future. The system 100 then determines the content with respect to the specified period of time and matches the content based on the specified time. In this way, the user can view content relevant to the POI at any particular time. For example, to view upcoming 1-hour sales items for babies clothes and plan when to visit the POI, the system 100 enables the user to specify the 1-hour time period and displays to the user detailed sales content, a corresponding floor plan and a walking route to the store.

As shown in FIG. 1, a user equipment (UE) 101 may retrieve content information (e.g., content and location information) and mapping information (e.g., maps, GPS data, prerecorded panoramic views, etc.) from a content mapping platform 103 via a communication network 105. The content and mapping information can be used by a mapping and augmented reality application 107 on the UE 101 (e.g., an augmented reality application, navigation application, or other location-based application) to a live image view and/or a prerecorded panoramic view. In the example of FIG. 1, the content mapping platform 103 stores mapping information in the map database 109*a* and content information in the content catalog 109*b*. By way of example, mapping information includes digital maps, GPS coordinates, prerecorded panoramic views, geo-tagged data, points of interest data, or a combination thereof. By way of example, content information includes one or more identifiers, metadata, access addresses (e.g., network address such as a Uniform Resource Locator (URL) or an Internet Protocol (IP) address; or a local address such as a file or storage location in a memory of the UE 101, description, or the like associated with content. In one embodiment, content includes live media (e.g., streaming broadcasts), stored media (e.g., stored on a network or locally), metadata associated with media, text information, location information of other user devices, or a combination thereof. The content may be provided by the service platform 111 which includes one or more services 113*a*-113*n* (e.g., music service, mapping service, video service, social networking service, content broadcasting service, etc.), the one or more content providers 115*a*-115*m* (e.g., online content retailers, public databases, etc.), other content source available or accessible over the communication network 105.

Additionally or alternatively, in certain embodiments, a user map and content database 117 of the UE 101 may be utilized in conjunction with the application 107 to present content information, location information (e.g., mapping and navigation information), availability information, etc. to the user. The user may be presented with an augmented reality interface associated with the application 107 and/or the content mapping platform allowing 3D objects or other representations of content and related information to be superimposed onto an image of a physical environment on the UE 101. In certain embodiments, the user interface may display a hybrid physical and virtual environment where 3D objects from the map database 109*a* are superimposed on top of a physical image.

By way of example, the UE 101 may execute the application 107 to receive content and/or mapping information from the content mapping platform 103 or other component of the network 105. As mentioned above, the UE 101 utilizes GPS satellites 119 to determine the location of the UE 101 to utilize the content mapping functions of the content mapping platform 103 and/or the application 107, and the map information stored in the map database 109*a* may be created from live camera views of real-world buildings and other sites. As such, content can be augmented into prerecorded panoramic views and/or live camera views of real world locations (e.g., based on location coordinates such as global positioning system (GPS) coordinates).

The application 107 and the content mapping platform 103 receive access information about content, determines the availability of the content based on the access information, and then presents a prerecorded panoramic view or a live image view with augmented content (e.g., a live camera view of the IMF building with augmented content, such as its origin, mission, facilities information: height, a number of floor, etc.). In certain embodiments, the content information may include 2D and 3D digital maps of objects, facilities, and structures in a physical environment (e.g., buildings).

By way of example, the communication network 105 of the system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), satellite, mobile ad-hoc network (MANET), and the like.

The UE 101 is any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), or any combination thereof. It is also contemplated that the UE 101 can support any type of interface to the user (such as "wearable" circuitry, etc.).

By way of example, the UE 101, and content mapping platform 103 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

In one embodiment, the application 107 and the content mapping platform 103 may interact according to a client-server model, so that the application 107 of the UE 101 requests mapping and/or content data from the content mapping platform 103 on demand. According to the client-server model, a client process sends a message including a request to a server process, and the server process responds by providing a service (e.g., providing map information). The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

Figure 2:
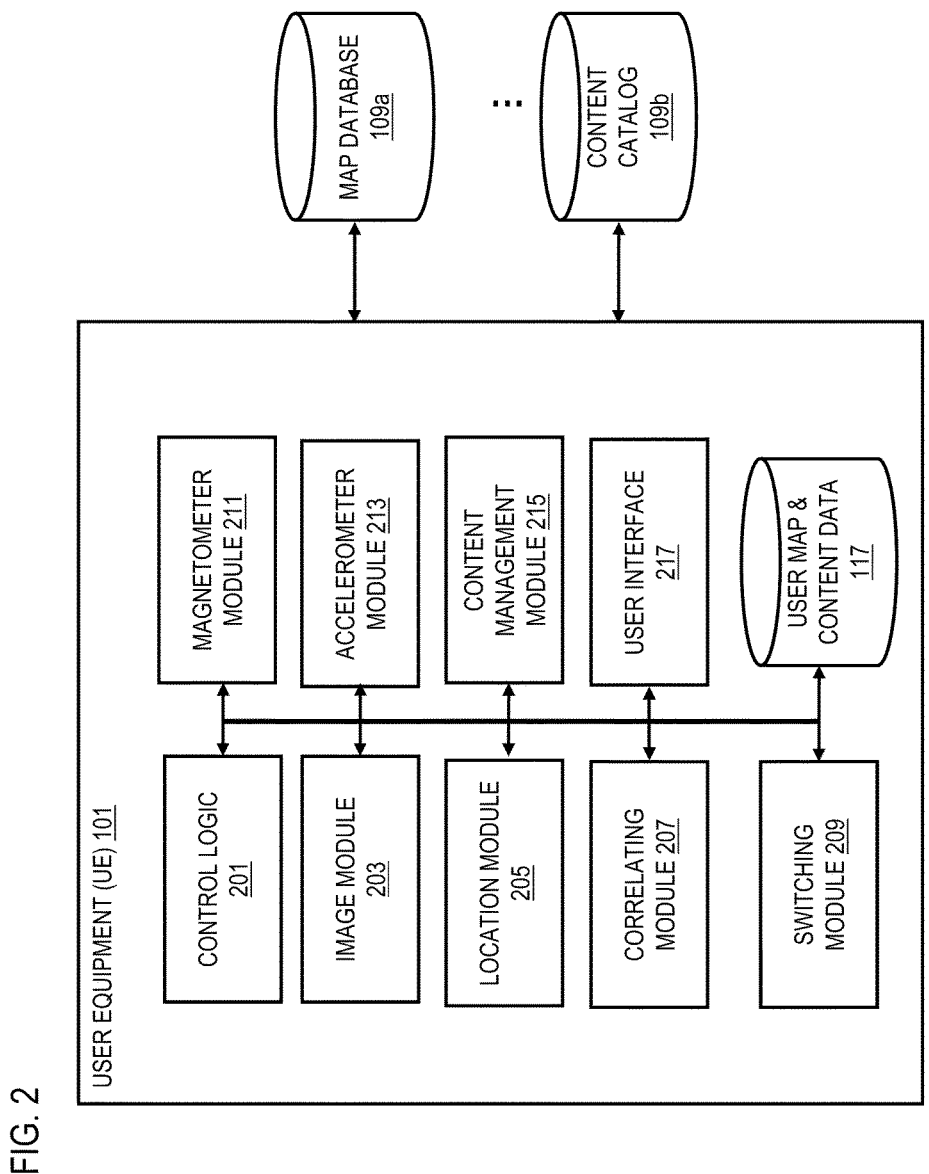
FIG. 2 is a diagram of the components of a mapping and augmented reality application, according to one embodiment.

FIG. 2 is a diagram of the components of a mapping and augmented reality application, according to one embodiment. By way of example, the mapping and augmented reality application 107 includes one or more components for correlating and navigating between a live camera image and a prerecorded panoramic image. It is contemplated that the functions of these components may be combined in one or more components or performed by other components of equivalent functionality. In this embodiment, the mapping and augmented reality application 107 includes at least a control logic 201 which executes at least one algorithm for executing functions of the mapping and augmented reality application 107. For example, the control logic 201 interacts with an image module 203 to provide to a user a live camera view of the surrounding of a current location of the UE 101 (e.g., the Farragut West METRO Station). The image module 203 may include a camera, a video camera, a combination thereof, etc. In one embodiment, visual media is captured in the form of an image or a series of images.

Next, the control logic 201 interacts with a location module 205 to retrieve location data of the current location of the UE 101. In one embodiment, the location data may include addresses, geographic coordinates (e.g., GPS coordinates) or other indicators (e.g., longitude and latitude information) that can be associated with the current location. For example, the location data may be manually entered by the user (e.g., entering an address or title, clicking on a digital map, etc.) or extracted or derived from any geo-tagged data. It is contemplated that the location data or geo-tagged data could also be created by the location module 205 by deriving the location associated metadata such as media titles, tags, and comments. More specifically, the location module 205 can parse the metadata for any terms that indicate association with a particular location.

In one embodiment, the location module 205 determines the user's location by a triangulation system such as a GPS, assisted GPS (A-GPS) A-GPS, Cell of Origin, wireless local area network triangulation, or other location extrapolation technologies. Standard GPS and A-GPS systems can use satellites 119 to pinpoint the location (e.g., longitude, latitude, and altitude) of the UE 101. A Cell of Origin system can be used to determine the cellular tower that a cellular UE 101 is synchronized with. This information provides a coarse location of the UE 101 because the cellular tower can have a unique cellular identifier (cell-ID) that can be geographically mapped. The location module 205 may also utilize multiple technologies to detect the location of the UE 101. GPS coordinates can provide finer detail as to the location of the UE 101. As previously noted, the location module 205 may be utilized to determine location coordinates for use by the application 107 and/or the content mapping platform 103.

Again, the control logic 201 interacts with the image module 203 to display the live camera view and location data of the current location (e.g., the Farragut West METRO Station).

While displaying the live camera view of the current location, the control logic 201 interacts with the image module 203 to receive an indication of switching views by the user by, for example, touching a "Switch" icon on the screen of the UE 101. The control logic 201 interacts with a correlating module 207 to correlate the live image view with a prerecorded panoramic view with the location data, and also interacts with a switching module 209 to alternates/switch the display from the live image view to the correlated prerecorded panoramic view.

In another embodiment, the switching module 209 interacts with a magnetometer module 211 which determines horizontal orientation or directional heading (e.g., a compass heading) of the UE 101, and an accelerometer module 213 which determines vertical orientation or an angle of elevation of the UE 101. Thereafter, the switching module 209 interact with the image module 203 to display on the screen of the UE 101 different portions of the prerecorded panoramic view depending upon the tilt angle and directional heading of the UE 101 as tilted and/or rotated by the user. Under these circumstances, the user can view different portions of the prerecorded panoramic view, without moving/dragging a viewing tag on the screen of the UE 101.

In one embodiment, horizontal directional data obtained from a magnetometer is utilized to determine the orientation of the UE 101. The magnetometer module 211 can include an instrument that can measure the strength and/or direction of a magnetic field. Using the same approach as a compass, the magnetometer is capable of determining the directional heading of a UE 101 using the magnetic field of the Earth. The front of the image capture device (e.g., a digital camera) (or another reference point on the UE 101) can be marked as a reference point in determining direction. Thus, if the magnetic field points north compared to the reference point, the angle the UE 101 reference point is from the magnetic field is known. Simple calculations can be made to determine the direction of the UE 101. This directional information may be correlated with the location information of the UE 101 to determine where (e.g., at which geographic feature or object) the UE 101 is pointing towards. This information may be utilized to select a portion of the prerecorded panoramic view to render to the user.

Further, the accelerometer module 213 may include an instrument that can measure acceleration. Using a three-axis accelerometer, with axes X, Y, and Z, provides the acceleration in three directions with known angles. Once again, the front of a media capture device can be marked as a reference point in determining direction. Because the acceleration due to gravity is known, when a UE 101 is stationary, the accelerometer module 213 can determine the angle the UE 101 is pointed as compared to Earth's gravity. In one embodiment, vertical directional data obtained from an accelerometer is used to determine the angle of elevation or tilt angle at which the UE 101 is pointing. This information in conjunction with the magnetometer information and location information may be utilized to determine a viewpoint in the prerecorded panoramic view to the user. As such, this information may be utilized in selecting available content items to present navigational information to the user. Moreover, the combined information may be utilized to determine portions of a particular digital map or a prerecorded panoramic view that may interest the user.

The control logic then interacts with the image module 203 to render a viewpoint in the prerecorded panoramic view to the user, whenever the user rotates/tilts the UE 101. As mentioned, the correlating module 207 can obtain the live image from a camera and correlate the live image with a prerecorded panoramic view via location information. In addition, the correlating module 207 uses magnetometer information, accelerometer information, or a combination thereof to determine a viewpoint to display a portion of the prerecorded panoramic view to the user.

The control logic 201 then interacts with a content management module 215 and the image module 203 to augment content information related to one or more POIs in the live image therein. The content may be received from the service platform 111, the services 113a-113n, the content providers 115a-115m, other like components, or a combination thereof. It is also contemplated that the user or another party authorized by the user may manually enter a content item. In one embodiment, the content management module 215 may create a content catalog listing all content items and associated access addresses provided to the content management module 215. In certain embodiments, the content catalog may include additional descriptive information and other metadata describing the content. The available media content or stream can take many forms (e.g., live video feeds, photographs, audio files, etc.) and can be delivered using any number means (e.g., streaming media, downloaded media, spontaneously created media, etc.). The content management module 215 includes one or more sub-modules or application programming interfaces (APIs) (not pictured) for receiving and/or detecting the media content in its native format or for converting the media content to a media format compatible with the mapping and augmented reality application 107. In other embodiments, the content management module 215 may initiate a download or installation of the components (e.g., codecs, player applications, etc.) needed to verify the content or stream. The content data can be cached or save in the user map and content database 117.

To facilitate finding specific content or features, the content management module 215 enables the user to input search criteria (e.g., a content item, person, city, weather, etc.) and to get guidance for finding the direction where the searched content item is located in the real physical world. The content management module 215 also enables a user to specify a time period so as to navigate content information using both location and time. In one embodiment, the default time for viewing the content and mapping information is the present. If a time period is set as future, the content management module 215 will determine the one or more content items based on the specified time, such as what will be on sales in the next three hours on the 4$^{th}$ floor of the department store. By way of example, the sales content and product information can be presented on a floor plan with representations of each product placed according to the associated location information.

The content can be depicted as a thumbnail overlaid on the user interface map at the location corresponding to a point of interest (e.g., a floor) or a portion of the point of interest (e.g., facilities on the floor). As discussed, the user interface may be a graphical user interface. In addition or alternatively, the user interface may be an audio or tactile interface. In one embodiment, the content management nodule 215 presents only those content items that are available at the specified time and are not associated with any limitations or exclusive restrictions. This embodiment provides a user experience in which users can simply select from the presented content items and be assured that the selected item will be available with a single selection click. In other embodiments, the content management module 215 may present all available content and differentiate the presentation of content available with a single click versus content associated with additional limitations or restrictions. The specific types of presentations can be specified by the user, content provider 115, network operator, service platform 111, or a combination thereof. The content management module 215 then determines whether to periodically update the content information.

In certain embodiments, when there is much more content available than can be displayed in the existing user interface, the content management nodule 215 constantly animates the display of the content items so that new content keeps appearing while older content disappears. This animation process also makes the user interface more entertaining to users and gives a feeling of the world being "alive" with activity.

In certain embodiments, the user map and content database 117 includes all or a portion the information in the map database 109a and the content catalog 109b. From the selected viewpoint, a live image view augmented with the content can be provided on the screen of the UE 101. In certain embodiments, the content management nodule 215 provides a correlated prerecorded panoramic view from the selected view point with content generated or retrieved from the database 117 or the content mapping platform 103. The content information can be embedded/tagged in the correlated prerecorded panoramic view previously by another apparatus or by the content management nodule 215 on demand and/or in a real time manner when displays the correlated prerecorded panoramic view on the screen of the UE 101.

Content and mapping information may be presented to the user via a user interface 217, which may include various methods of communication. For example, the user interface 217 can have outputs including a visual component (e.g., a screen), an audio component (e.g., a verbal instructions), a physical component (e.g., vibrations), and other methods of communication. User inputs can include a touch-screen interface, microphone, camera, a scroll-and-click interface, a button interface, etc. Further, the user may input a request to start the application 107 (e.g., a mapping and augmented reality application) and utilize the user interface 217 to receive content and mapping information. Through the user interface 217, the user may request different types of content, mapping, or location information to be presented.

Further, the user may be presented with 3D or augmented reality representations of particular locations and related objects (e.g., buildings, terrain features, POIs, etc. at the particular location) as part of a graphical user interface on a screen of the UE 101. As mentioned, the UE 101 communicates with the content mapping platform 103 service platform 111, and/or content providers 115a-115m to fetch content, mapping, and or location information. The UE 101 may utilize requests in a client server format to retrieve the content and mapping information. Moreover, the UE 101 may specify location information and/or orientation information in the request to retrieve the content and mapping information.

Figure 3:
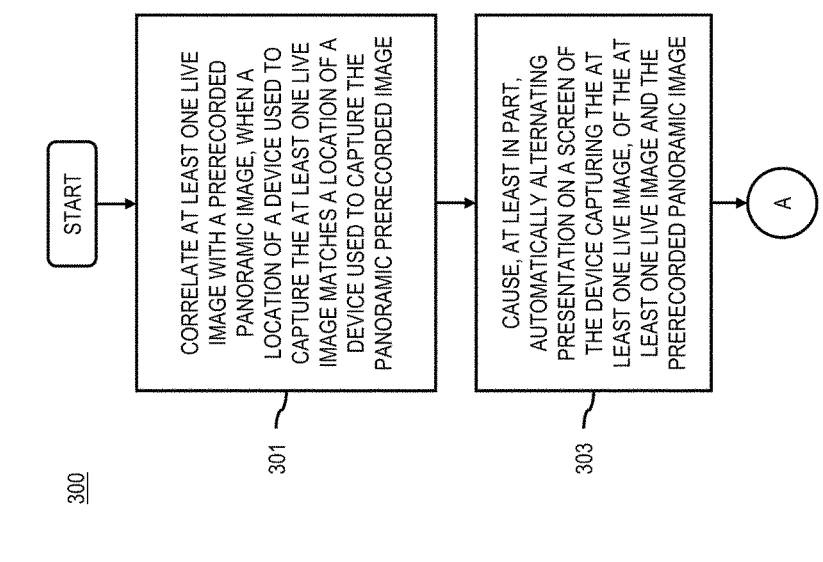
FIG. 3 is a flowchart of a process for correlating and navigating between a live camera image and a prerecorded panoramic image, according to one embodiment.

FIG. 3 is a flowchart of a process for correlating and navigating between a live camera image and a prerecorded panoramic image, according to one embodiment. In one embodiment, the mapping and augmented reality application 107 performs the process 300 and is implemented in, for instance, a chip set including a processor and a memory as shown FIG. 8. In step 301, the mapping and augmented reality application 107 correlates at least one live image with a prerecorded panoramic image, when the current location of the UE 101 (e.g., the Farragut West METRO Station) matches a location of a device used to capture the panoramic prerecorded image. After the user orders a switch from the live image to the correlated panoramic prerecorded image, the mapping and augmented reality application 107 causes, at least in part, automatically alternating presentation on a screen of the UE 101, of the at least one live image and the prerecorded panoramic image (Step 303). In another embodiment, the images are switched when a predetermined switching condition is met. By way of example, the switching condition can be a predetermined time of the day (e.g., a lunch time so as to see restaurant information augmented in the prerecorded panoramic image), or reaching a predetermined POI (e.g., a Wi-Fi hotspot, the IMF, the store with predetermined on sale items), etc.

Figure 4:
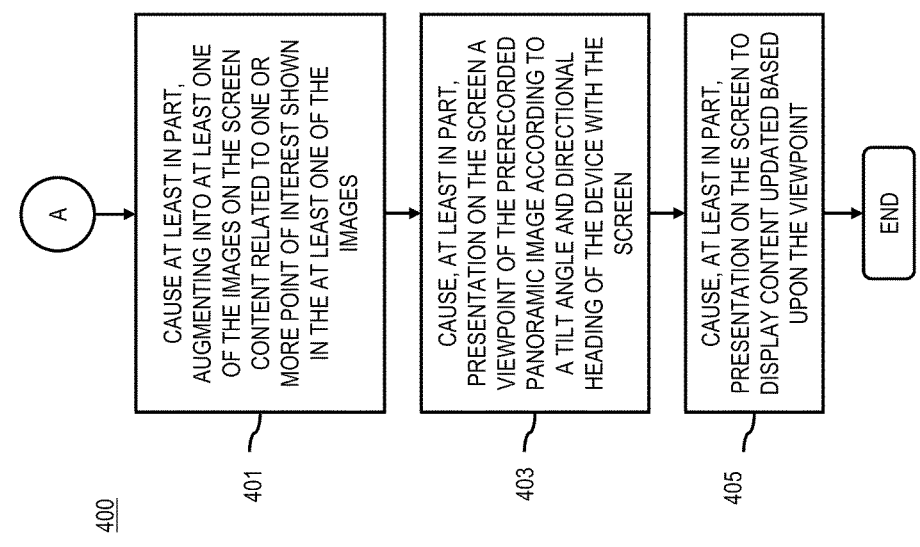
FIG. 4 is a flowchart of a process for providing content specifically directed to one or more points of interest in a live camera view or a correlated prerecorded panoramic view, according to one embodiment.

FIG. 4 is a flowchart of a process for providing content specifically directed to one or more points of interest in a live camera view or a correlated prerecorded panoramic view, according to one embodiment. In one embodiment, the mapping and augmented reality application 107 performs the process 400 and is implemented in, for instance, a chip set including a processor and a memory as shown FIG. 8. In step 401, the mapping and augmented reality application 107 causes, at least in part, augmenting into at least one of the images on the screen content related to one or more point of interest shown in the at least one of the images. By way of example, the mapping and augmented reality application 107 can retrieve and augment, in a real time manner for the live image of the correlated prerecord panoramic image, content directed to the one or more points of interest based upon the geographic coordinates of the points of interest. In another embodiment, the application 107 retrieves the correlated prerecord panoramic image together with the content information of the POIs in the correlated prerecord panoramic image that is embedded/tagged in the correlated prerecord panoramic image By way of example and continuing with the example of the department store discussed above, the application 107 sets the 4$^{th}$ floor of the department store as a POI based upon the user's indication. The application 107 then retrieves the sales content and product information available for the 4$^{th}$ floor, and augments the content into a live image or a correlated prerecord panoramic image.

An inherent property of an augmented reality user interface is that the displayed content is dependent on the viewpoint and that to view a specific point or content located on the ground, the user can specify a viewpoint of interest to the application 107 via the UE 101. The user can rotate/tilt the UE 101 to specify the viewpoint of interest. After the user specifies specify the viewpoint of interest, the mapping and augmented reality application 107 causes, at least in part, presentation on the screen the viewpoint in the correlated prerecorded panoramic image according to a tilt angle and directional heading of the UE 101 (Step 403).

The mapping and augmented reality application 107 causes, at least in part, presentation on the screen to display content updated based upon the viewpoint (Step 405). By way of example, the application 107 presents the sales content and product information of the next hour on a floor plan with representations of each product placed according to their location on the 4th floor.

As noted previously, an inherent property of an augmented reality user interface is that the display follows the movement and pointing of the UE 101. In some cases (e.g., when the user has found and is displaying a favorite viewpoint), the user may wish to "lock" or fix the display at a particular viewpoint without having to maintain the UE 101 in the same position. When seeing the $4^{th}$ floor of the department store, the user can fix the viewpoint of the correlated prerecorded panoramic image so as to save a POI in the system 100.

The application 107 also prompts the user to specify a time period so as to retrieve content using both location and time. In one embodiment, the default time for viewing the content and mapping information is the present. If a time period is set as future, the application 107 determines the content based on the specified time, such as what will be on sale in the next hour on the $4^{th}$ floors of the department store.

Figure 5:
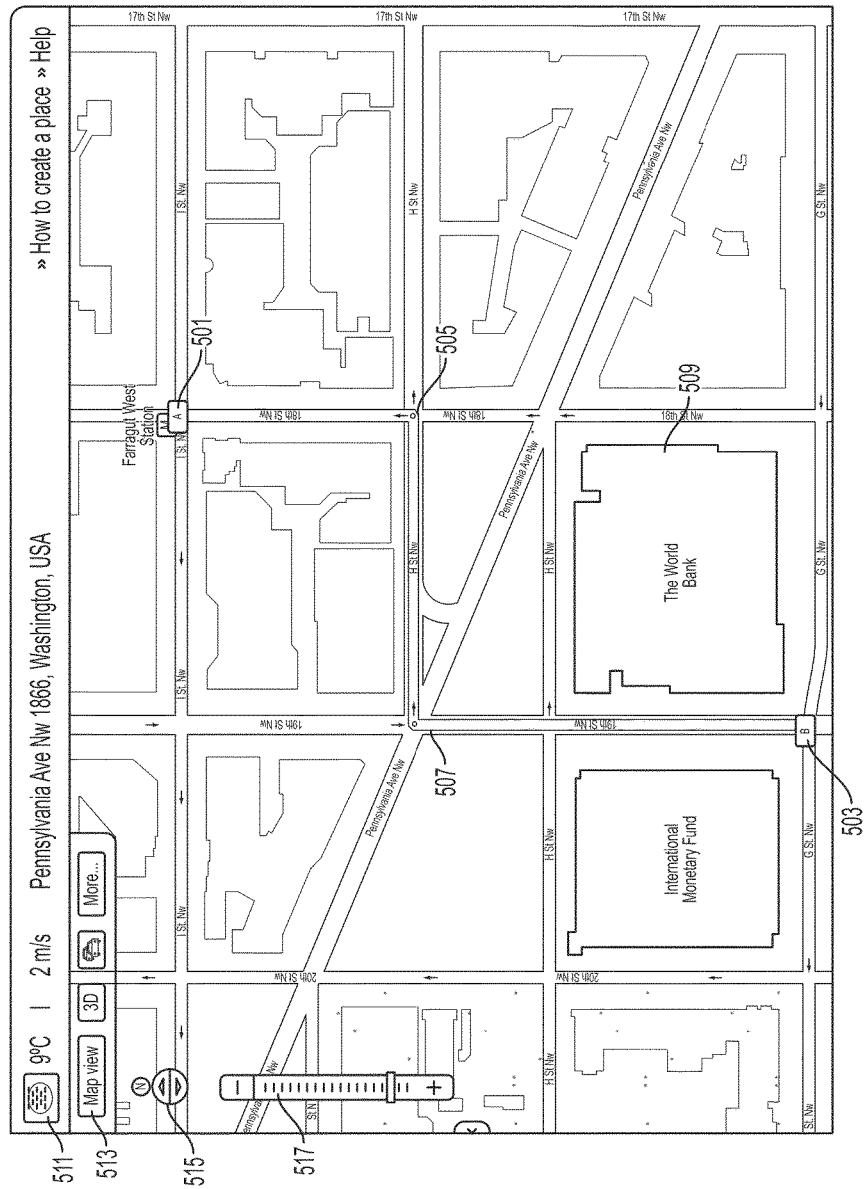
FIG. 5 is a diagram of a 2D digital map for navigation, according to one embodiment.

FIG. 5 is a diagram of a 2D digital map for navigation, according to one embodiment. If the user, the application 107 provides a 2D digital map 500 as shown in FIG. 5 on the screen of the UE 101 to the user for the user to indicate on the screen a destination location (e.g., the IMF). The application 107 then shows in the 2D map 500 a route from the current location (i.e., the Farragut West Metro Station located at 900 18th St. NW Washington D.C. to the destination (i.e., the IMF located at 700 19th St. NW Washington D.C.). By way of example, the application 107 also shows in the map 500 a tab "A" 501 to the current location, a tab "B" 503 to the destination location, a dot 505 at a turning point located at the cross section of the H St. and the $18^{th}$ St., a dot 507 at a turning point located at the cross section of the H St. and the $19^{th}$ St., and a point of interest "World Bank" tab 509. On the top of the map, the application 107 shows a bar according the screen 511 including several indicators, such as a weather indicator, the local temperature, etc. The application 107 shows a shorter bar 513 under the bar 511 including several icons, such as "Map View, "3D", etc. Below the bar 513, there are a direction icon 515 and a zoom icon 517.

Figure 6A:
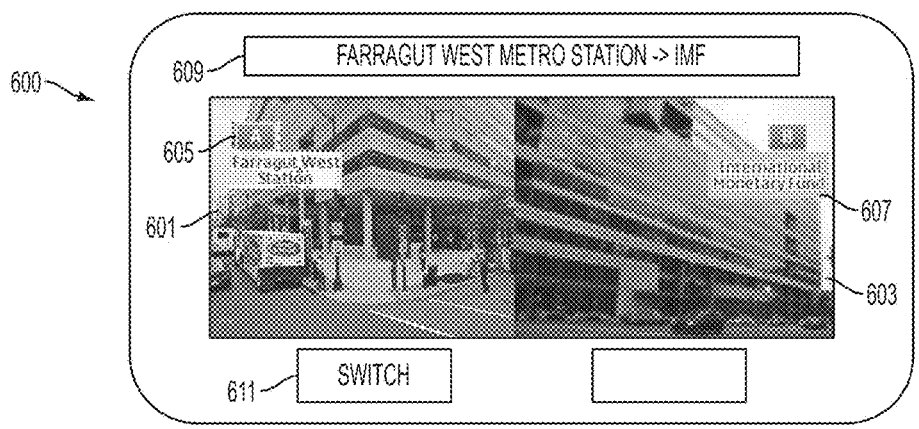
FIGS. 6A-6H are diagrams of user interfaces utilized in the processes of FIGS. 3 and 4, according to various embodiments.

FIGS. 6A-6H are diagrams of user interfaces utilized in the processes of FIGS. 3 and 4, according to various embodiments. As mentioned, the mapping and augmented reality application 107 allows the user to switch between a live image 601 and a correlated prerecorded panoramic image 603 whether the user is standing at a current location or navigating to another location. By way of example, after displaying the Map with the route in FIG. 5, the application 107 displays a live view of the currently location side-by-side with the correlated prerecorded panoramic image of the destination, as well as augmented content 605 (e.g., "Farragut West Station") with the "A" tab on the live image and augmented content 607 (e.g., "International Monetary Fund") with the "B" tab on the correlated prerecorded panoramic image of the destination as shown in FIG. 6A. In addition, the text of "Farragut West METRO Station→IMF" is shown in a direction bar 609 on the top of the screen of the UE 101 in FIG. 6A. Moreover, the UE 101 has a "Switch" button 611 for the user to press and trigger the switch of views of the current location on the left side of the screen.

Figure 6B:
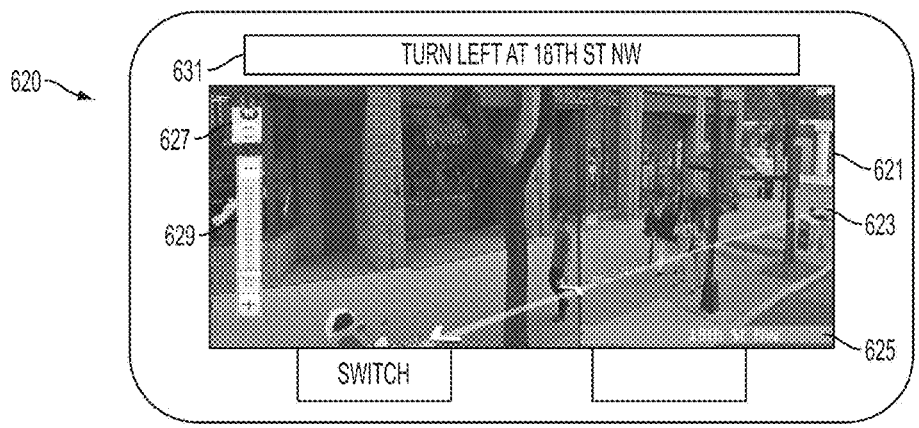
Figure 6C:
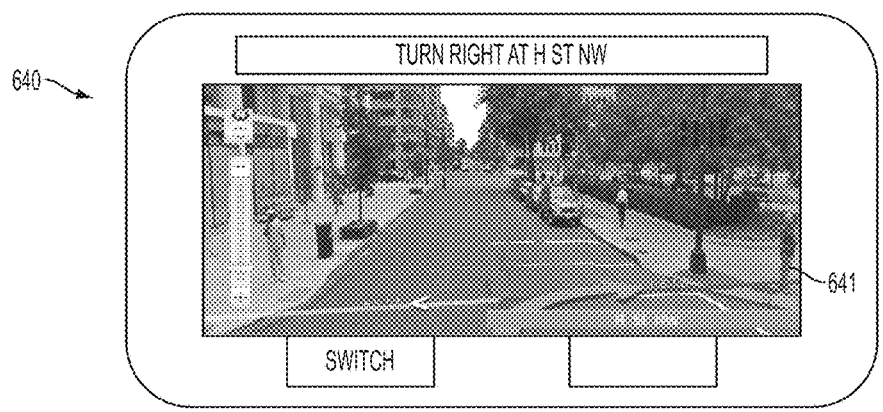

When the user starts walking on the route, the application displays the live image on the route either side-by-side with the correlated prerecorded panoramic image of the destination, or just the live image or the correlated prerecorded panoramic image of the current location occupying the whole screen. By way of example, FIG. 6B shows a live view 621 of the current location on the $18^{th}$ St. occupying the whole screen. The image 621 is augmented with a direction line 623 with an arrow on the $18^{th}$ St, a text of "$18^{th}$ St NW" 625, a direction icon 627 and a zoom icon 629. In addition, the application 107 displays the text of "Turn left at 18th St NW" in a direction bar 631 on the top of the screen of the UE 101 in FIG. 6B. As the user continues walking along the route, the application 107 displays similar contents for the turning points located at the cross section of the H St. and the $18^{th}$ St. and located at the cross section of the H St. and the $19^{th}$ St. respectively in a live image 641 in FIG. 6C and in a live image 651 in FIG. 6D.

Figure 6D:
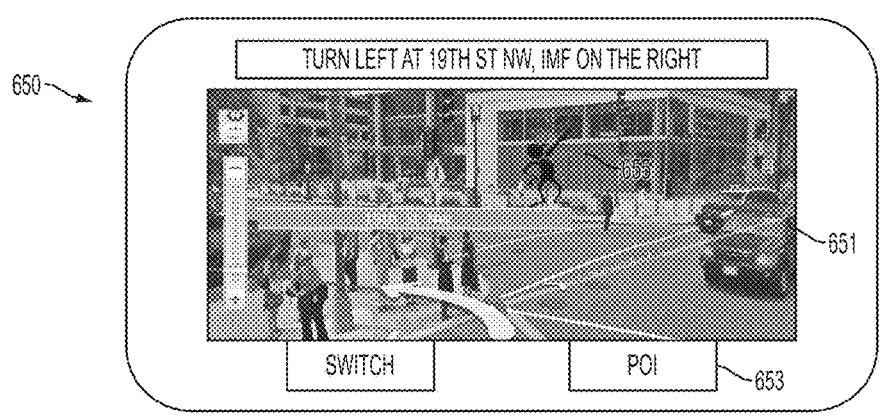

In another embodiment, a "POI" button 653 is provided in FIG. 6D for the user to press and trigger a POI icon 655, i.e., a character of human form with a finger pointing at a building of interest in the live image 651. The application 107 then determines the location data of the POI based upon the position of the POI icon 655 on the screen and the location data of the UE 101. The application 107 can also retrieve the content information of the POI in a real time manner as previously described.

Figure 6E:
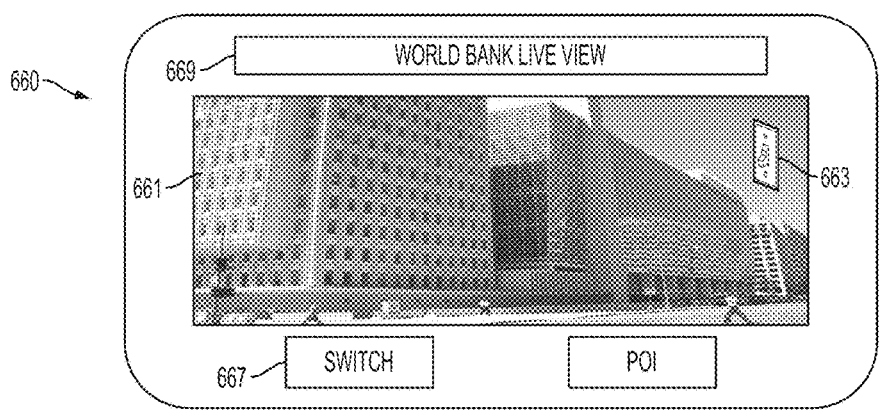

When the user is walking on the $19^{th}$ St., the user notices another POI on the left, the user indicates to the application 107 to set the building as a POI with the POI button and the POI icon inn the live image 661 in FIG. 6E. In this embodiment, the application 107 provides the user a switching icon 663 to order a switch between the live image view and the correlated prerecorded panoramic image of the current location and/or a POI. The switching icon 663 can be augmented to the live image by default when the live image becomes available, or called out by pressing a Switch button 667 for a predetermined period of time (e.g., 30 seconds). In addition, the application 107 displays the text of "World Bank Live View" in a direction bar 669 in FIG. 6E.

Figure 6F:
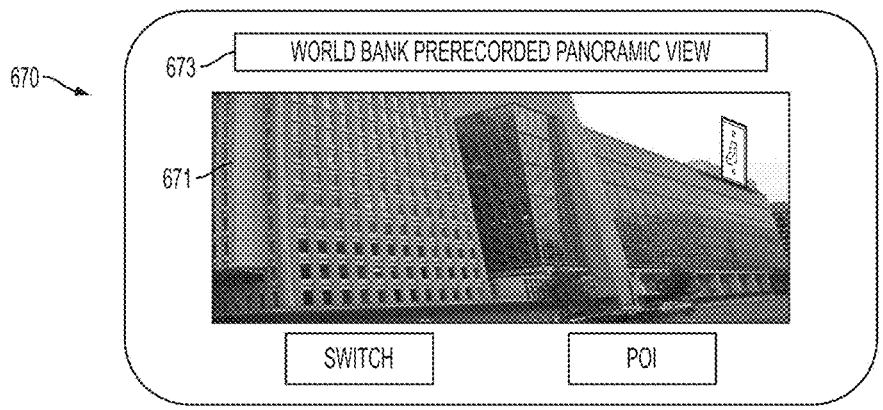

By way of example, the user can switch between the live image 661 of the World Bank in FIG. 6E to a correlated prerecorded panoramic image 671 of the World Bank in FIG. 6F, by touching the switching icon 663 in the live image 661. In this case, the live image 661 and the correlated prerecorded panoramic image 671 show the World Bank from approximately the same viewpoint. In addition, the application 107 displays the text of "World Bank Prerecorded Panoramic View" in a direction bar 673 in FIG. 6F.

Figure 6G:
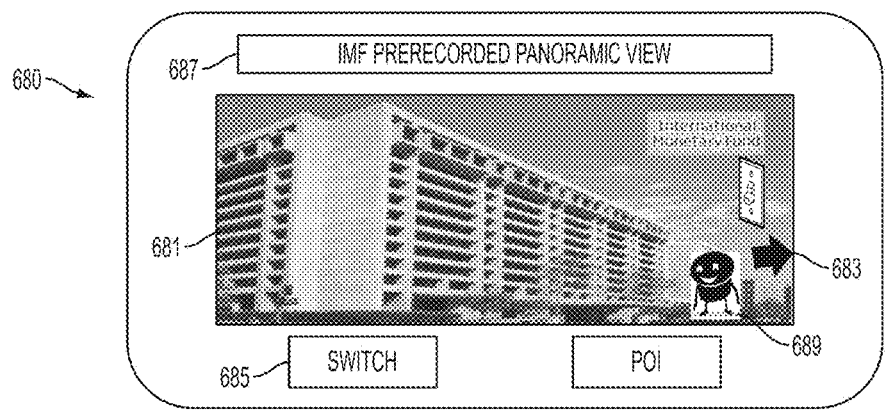

When the user walks close to the IMF, the user can see the IMF on the right hand side and the World Bank of the left hand side. By way of example, in response to a preset switching condition (e.g., 50 feet from the destination), the application 107 automatically switches from the live image to a correlated prerecorded panoramic image 681 of the IMF as shown in FIG. 6G. In this embodiment, the application 107 further provides the user a navigation arrow 683 to order a switch between a live image view and a correlated prerecorded panoramic image of the current location and/or a POI. The navigation arrow 683 can be augmented to the live image by default when the live image becomes available, or called out by pressing a Switch button 685 for a predetermined period of time (e.g., 40 seconds). In addition, the application 107 displays the text of "IMF Prerecorded Panoramic View" in a direction bar 687.

Figure 6H:
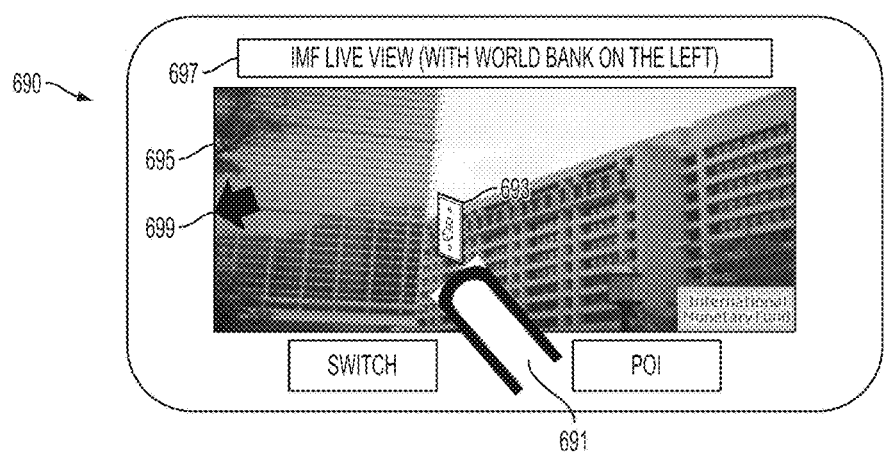

In another embodiment, when the user sees the IMF on the right hand side and the World Bank of the left hand side in the live image view as shown in FIG. 6H and would like to see the further end of the IMF building, the user can tap with a finger 691 at the furthest point of the IMF building on the screen in the live view, to switch to a prerecorded panoramic view taken from another perspective including the further end of the IMF building (e.g., FIG. 6G). In yet another embodiment, the user can move the Switch icon 693 to furthest point of the IMF building on the screen, and then tap the Switch icon 693 to switch to the prerecorded panoramic view taken therefrom. In this prerecorded panoramic view, the user can rotate and tilt the UE 101 to preview the further end of the IMF building, before the user actually walks there. When the user rotates the UE 101 to point to the direction the user is in the real world, the prerecorded panoramic view is augmented with an indicator 689 (e.g., a human character or avatar) to show the user's current location in the prerecorded panorama view (e.g., FIG. 6G).

By way of example, the user can switch from the correlated prerecorded panoramic image 681 of the IMF in FIG. 6G to a live image 695 of the IMF in FIG. 6H, by moving the navigation arrow 683 to reach an edge of the correlated prerecorded panoramic image 681 as shown in FIG. 6G. In this case, the correlated prerecorded panoramic image 681 and the live image 695 show the IMF from two different viewpoints. In addition, the application 107 displays the text of "IMF Live View (with World Bank on the left)" in a direction bar 697. Conversely, the user can switch from the live image 695 of the IMF in FIG. 6H back to the correlated prerecorded panoramic image 681 of the IMF in FIG. 6G, by moving the navigation arrow 699 to reach an edge of the live image 695 as shown in FIG. 6H.

In another embodiment, the application 107 causes, at least in part, augmenting and fixing a POI tab in the live camera view on the screen, i.e., locking the viewpoint parameters (e.g., location, directional heading, and angle of elevation) of the UE 101 at a fixed viewpoint. Even if the UE 101 is moved or turned away, the application 107 renders the content from the locked viewpoint.

By way of example, as the user walks towards the department store or walks into the department store to catch up with the coming 1-hour sale, the UE 101 cannot continue display the department store in the camera live image view. The application 107 starts a new window to show a 2D map with a route from the current location to the department store as the user is walking towards the department store. As the user steps inside the department store, the application 107 starts another window to display the floor plan of the $4^{th}$ floor and a route to guide the user to the coming 1-hour sale on that floor as well as the products and pricing information. Therefore, the application 107 can quickly provide content closely relevant to the POI at the fixed GPS coordinates.

The processes described herein for correlating and navigating between a live camera image and a prerecorded panoramic image may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 7:
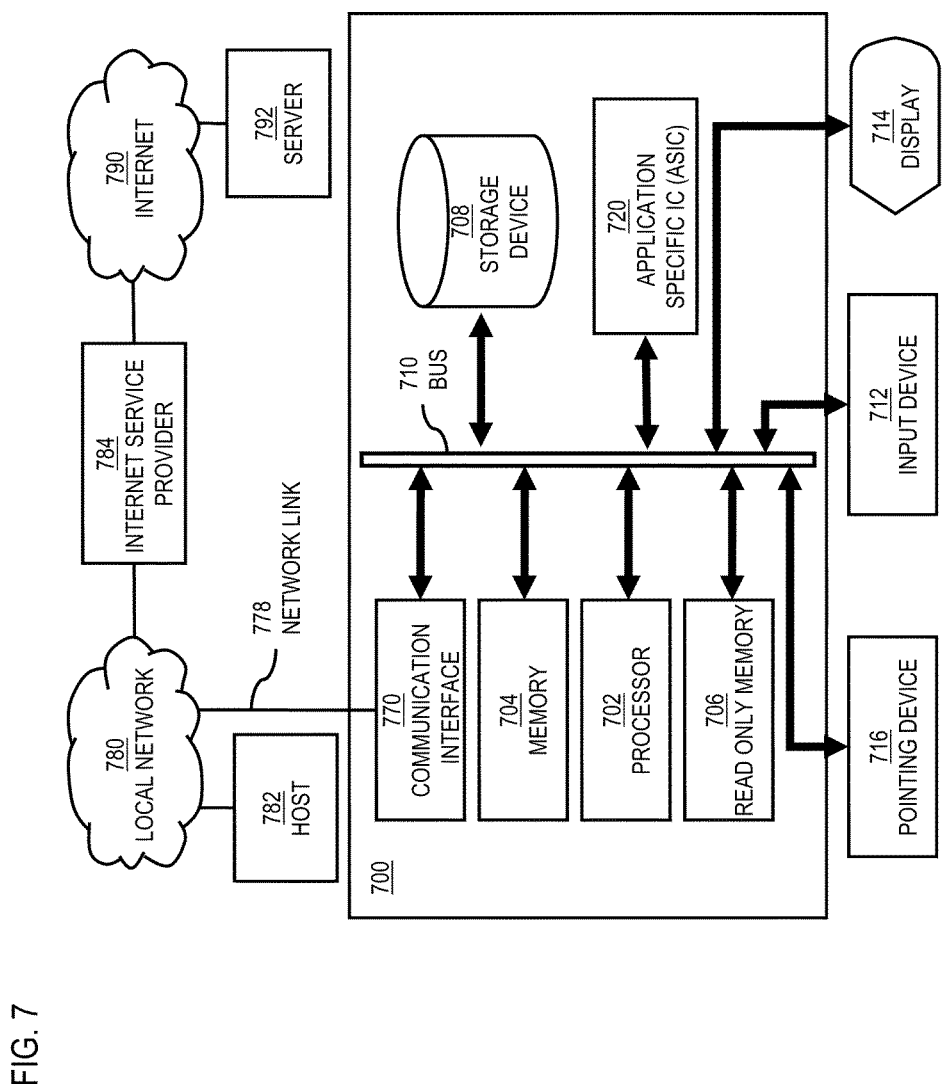
FIG. 7 is a diagram of hardware that can be used to implement an embodiment of the invention.

FIG. 7 illustrates a computer system 700 upon which an embodiment of the invention may be implemented. Although computer system 700 is depicted with respect to a particular device or equipment, it is contemplated that other devices or equipment (e.g., network elements, servers, etc.) within FIG. 7 can deploy the illustrated hardware and components of system 700. Computer system 700 is programmed (e.g., via computer program code or instructions) to correlate and navigate between a live camera image and a prerecorded panoramic image as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of correlating and navigating between a live camera image and a prerecorded panoramic image.

A bus 710 includes one or more parallel conductors of information so that information is transferred quickly among devices coupled to the bus 710. One or more processors 702 for processing information are coupled with the bus 710.

A processor 702 performs a set of operations on information as specified by computer program code related to correlate and navigate between a live camera image and a prerecorded panoramic image. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or other dynamic storage device, stores information including processor instructions for correlating and navigating between a live camera image and a prerecorded panoramic image. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for correlating and navigating between a live camera image and a prerecorded panoramic image, is provided to the bus 710 for use by the processor from an external input device 712, such as a keyboard containing alphanumeric keys operated by a human user, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT) or a liquid crystal display (LCD), or plasma screen or printer for presenting text or images, and a pointing device 716, such as a mouse or a trackball or cursor direction keys, or motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of application specific ICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection between the UE 101 and the communication network 105 for correlating and navigating between a live camera image and a prerecorded panoramic image.

The term "computer-readable medium" as used herein to refer to any medium that participates in providing information to processor 702, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 708. Volatile media include, for example, dynamic memory 704. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 792 connected to the Internet hosts a process that provides a service in response to information received over the Internet. For example, server host 792 hosts a process that provides information representing video data for presentation at display 714. It is contemplated that the components of system 700 can be deployed in various configurations within other computer systems, e.g., host 782 and server 792.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 792 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

Figure 8:
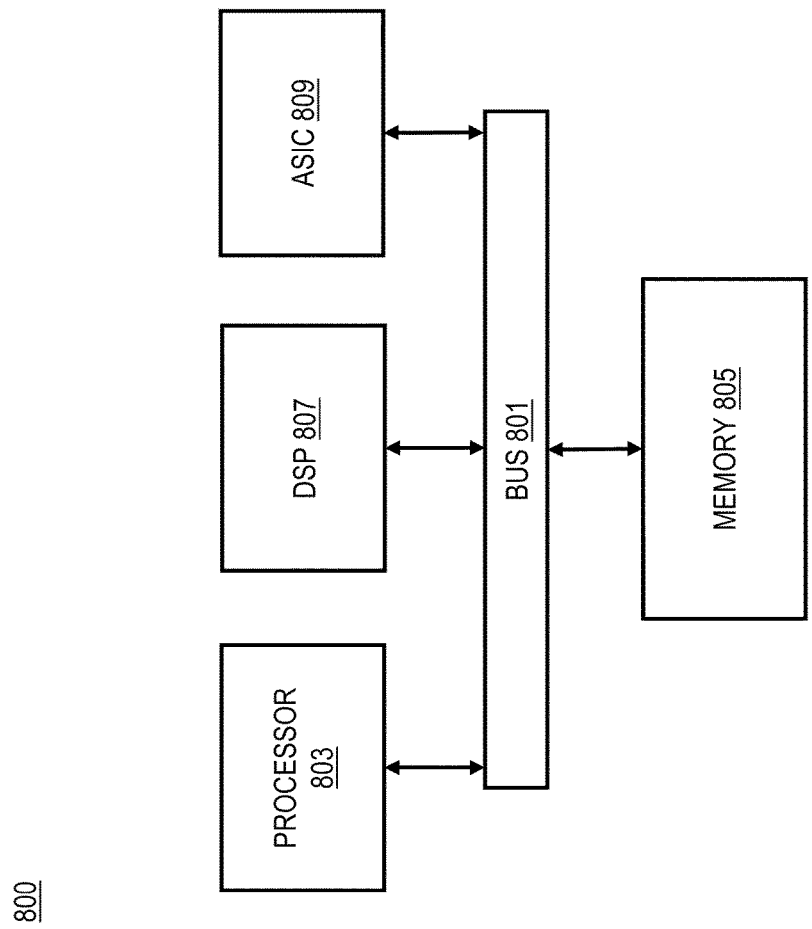
FIG. 8 is a diagram of a chip set that can be used to implement an embodiment of the invention.

FIG. 8 illustrates a chip set 800 upon which an embodiment of the invention may be implemented. Chip set 800 is programmed to correlate and navigate between a live camera image and a prerecorded panoramic image as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 800, or a portion thereof, constitutes a means for performing one or more steps of correlating and navigating between a live camera image and a prerecorded panoramic image.

In one embodiment, the chip set 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to correlate and navigate between a live camera image and a prerecorded panoramic image. The memory 805 also stores the data associated with or generated by the execution of the inventive steps.

Figure 9:
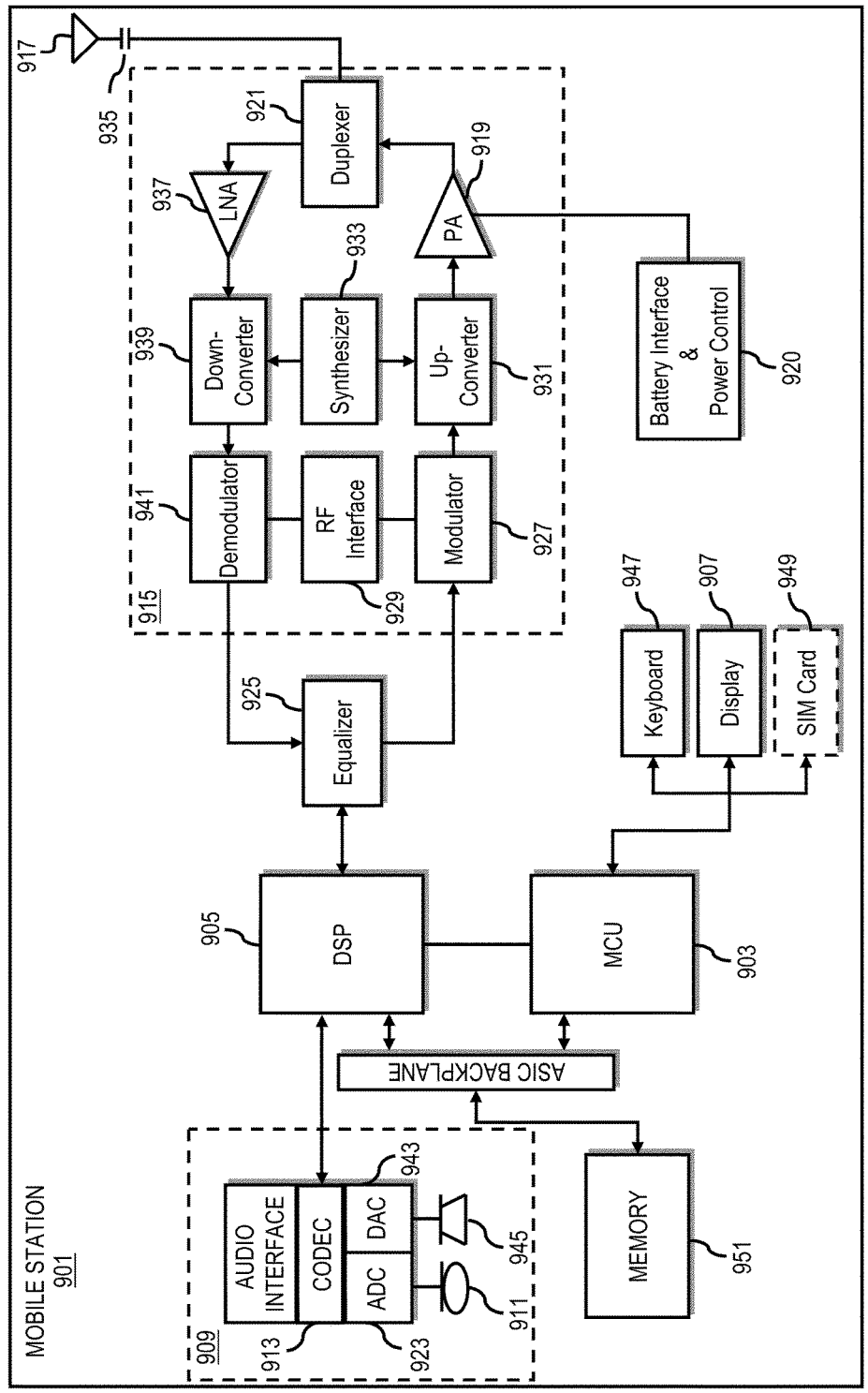
FIG. 9 is a diagram of a mobile terminal (e.g., handset) that can be used to implement an embodiment of the invention.

FIG. 9 is a diagram of exemplary components of a mobile terminal (e.g., handset) for communications, which is capable of operating in the system of FIG. 1, according to one embodiment. In some embodiments, mobile terminal 900, or a portion thereof, constitutes a means for performing one or more steps of correlating and navigating between a live camera image and a prerecorded panoramic image. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile terminal functions that perform or support the steps of correlating and navigating between a live camera image and a prerecorded panoramic image. The display 9 includes display circuitry configured to display at least a portion of a user interface of the mobile terminal (e.g., mobile telephone). Additionally, the display 907 and display circuitry are configured to facilitate user control of at least some functions of the mobile terminal. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile terminal 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903—which can be implemented as a Central Processing Unit (CPU) (not shown).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile terminal 901 to correlate and navigate between a live camera image and a prerecorded panoramic image. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the terminal. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile terminal 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile terminal 901 on a radio network. The card 949 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    correlating, with one or more processors, at least one live image with a prerecorded panoramic image when a location of a device used to capture the at least one live image matches a location of a device used to capture the panoramic prerecorded image; and
    causing, with the one or more processors, at least in part, switching between presentation on a screen of the device capturing the at least one live image, of the at least one live image and the prerecorded panoramic image,
    wherein address, geographic coordinates, and/or longitude and latitude information is used for the location of the device, and
    wherein the presentation on the screen only displays either the at least one live image or the prerecorded panoramic image.

2. A method of claim 1, further comprising:
    causing, at least in part, augmenting into at least one of the at least one live image and the prerecorded panoramic image that is on the screen content related to one or more points of interest shown in the at least one of the images.

3. A method of claim 1, wherein switching between presentation on the screen of the at least one live image and the prerecorded panoramic image activates in response to reception of an input specifying image switching, and the switching of presentation on the screen between the at least one live image and the prerecorded panoramic image successively continues after activation in response to another input specifying image switching.

4. A method of claim 1, wherein switching between presentation on the screen of the at least one live image and the prerecorded panoramic image activates in response to reception of a condition specifying image switching, and the switching of presentation on the screen between the at least one live image and the prerecorded panoramic image successively continues after activation in response to another condition specifying image switching.

5. A method of claim 1, wherein the at least one live image is automatically switched to the prerecorded panoramic image, when a viewing tag is navigating on the screen to an edge of the at least one live image.

6. A method of claim 1, further comprising:
    causing, at least in part, presentation on the screen a viewpoint of the prerecorded panoramic image according to a tilt angle and directional heading of the device with the screen.

7. A method of claim 1, further comprising:
    during displaying the live image and an indication of a turn in the live image, causing switching to a prerecorded panoramic image taken from the turn,
    wherein switching to the prerecorded panoramic image taken from the turn activates in response to a user tapping on the turn.

8. An apparatus comprising:
    at least one processor; and
    at least one memory including computer program code,
    the at least one memory and the computer program code configured to, with the at least one processor, cause the apparatus to perform at least the following,
    correlate at least one live image with a prerecorded panoramic image when a location of a device used to capture the at least one live image matches a location of a device used to capture the panoramic prerecorded image; and
    cause, at least in part, switching between presentation on a screen of the device capturing the at least one live image, of the at least one live image and the prerecorded panoramic image,
    wherein address, geographic coordinates, and/or longitude and latitude information is used for the location of the device, and
    wherein the presentation on the screen only displays either the at least one live image or the prerecorded panoramic image.

9. An apparatus of claim 8, wherein the apparatus is further caused to:
    cause, at least in part, augmenting into at least one of the images on the screen content related to one or more points of interest shown in the at least one of the images.

10. An apparatus of claim 8, wherein switching between presentation on the screen of the at least one live image and the prerecorded panoramic image activates in response to reception of an input specifying image switching, and the switching of presentation on the screen between the at least one live image and the prerecorded panoramic image successively continues after activation in response to another input specifying image switching.

11. An apparatus of claim 8, wherein switching between presentation on the screen between the at least one live image and the prerecorded panoramic image activates in response to reception of a condition specifying image switching, and the switching of presentation on the screen between the at least one live image and the prerecorded panoramic image successively continues after activation in response to another condition specifying image switching.

12. An apparatus of claim 8, wherein the at least one live image is automatically switched to the prerecorded panoramic image, when a viewing tag is navigating on the screen to an edge of the at least one live image.

13. An apparatus of claim 8, wherein the apparatus is further caused to:
    cause, at least in part, presentation on the screen a viewpoint of the prerecorded panoramic image according to a tilt angle and directional heading of the device with the screen.

14. A non-transitory computer-readable storage medium carrying one or more sequences of one or more instructions which, when executed by one or more processors, cause an apparatus to at least perform the following steps:
    correlating at least one live image with a prerecorded panoramic image when a location of a device used to capture the at least one live image matches a location of a device used to capture the panoramic prerecorded image; and
    causing, at least in part, switching between presentation on a screen of the device capturing the at least one live image, of the at least one live image and the prerecorded panoramic image, wherein address, geographic coordinates, and/or longitude and latitude information is used for the location of the device, and wherein the presentation on the screen only displays either the at least one live image or the prerecorded panoramic image.

15. A non-transitory computer-readable storage medium of claim 14, wherein the apparatus is caused to further perform:

causing, at least in part, augmenting into at least one of the images on the screen content related to one or more points of interest shown in the at least one of the images.

16. A non-transitory computer-readable storage medium of claim 14, wherein switching between presentation on the screen of the at least one live image and the prerecorded panoramic image activates in response to reception of an input specifying image switching, and the switching of presentation on the screen between the at least one live image and the prerecorded panoramic image successively continues after activation in response to another input specifying image switching.

17. A non-transitory computer-readable storage medium of claim 14, wherein switching between presentation on the screen of the at least one live image and the prerecorded panoramic image activates in response to reception of a condition specifying image switching, and the switching of presentation on the screen between the at least one live image and the prerecorded panoramic image successively continues after activation in response to another condition specifying image switching.

18. A non-transitory computer-readable storage medium of claim 14, wherein the at least one live image is automatically switched to the prerecorded panoramic image, when a viewing tag is navigating on the screen to an edge of the at least one live image.

19. A non-transitory computer-readable storage medium of claim 14, wherein the apparatus is caused to further perform:

causing, at least in part, presentation on the screen a viewpoint of the prerecorded panoramic image according to a tilt angle and directional heading of the device with the screen.

* * * * *